United States Patent
Nagano et al.

(10) Patent No.: US 7,457,067 B2
(45) Date of Patent: Nov. 25, 2008

(54) METHOD OF CONTROLLING A RECORDING CURRENT, AND MAGNETIC DISK DEVICE

(75) Inventors: Yumi Nagano, Kanagawa (JP); Michio Nakajima, Kanagawa (JP); Toyomi Ohsawa, Kanagawa (JP); Masato Taniguchi, Kanagawa (JP)

(73) Assignee: Hitachi Global Storage Technologies Netherlands B.V., AZ Amsterdam (NL)

( * ) Notice: Subject to any disclaimer, the term of this patent is extended or adjusted under 35 U.S.C. 154(b) by 176 days.

(21) Appl. No.: 11/228,669

(22) Filed: Sep. 16, 2005

(65) Prior Publication Data

US 2006/0056091 A1 Mar. 16, 2006

(30) Foreign Application Priority Data

Sep. 16, 2004 (JP) ............................. 2004-269897

(51) Int. Cl.
G11B 21/02 (2006.01)
G11B 5/02 (2006.01)
(52) U.S. Cl. .............................. 360/55; 360/67; 360/75
(58) Field of Classification Search .................. None
See application file for complete search history.

(56) References Cited

U.S. PATENT DOCUMENTS 5,909,336 A * 6/1999 Schaffner et al. ........ 360/77.08
6,914,738 B2 * 7/2005 Fujiwara et al. ............... 360/68
6,972,920 B2 * 12/2005 Kim et al. ...................... 360/75
7,023,641 B2 * 4/2006 Doi et al. ....................... 360/68
7,027,251 B1 * 4/2006 Darragh et al. ................ 360/75

FOREIGN PATENT DOCUMENTS

JP   2004-079126 A   3/2004
JP   2004-110918 A   4/2004

* cited by examiner

*Primary Examiner*—Joseph Feild
*Assistant Examiner*—Jason Olson
(74) *Attorney, Agent, or Firm*—Townsend and Townsend and Crew LLP; Patrick Duncan

(57) ABSTRACT

Embodiments of the invention make it possible to conduct stable recording on a magnetic disk, even in case of changes in flying height due to thermal protrusion. In one embodiment, a compensatory recording current value A2 is used when a first section of user data is recorded in the required number of data sectors from the data sector of the starting address for recording the user data to the data sector of an intermediate address. A recording current value A3 smaller than the compensatory recording current value is used when a second section of user data is recorded in the data sectors existing from the data sector of the intermediate address towards the ending address.

17 Claims, 6 Drawing Sheets

METHOD OF CONTROLLING A RECORDING CURRENT, AND MAGNETIC DISK DEVICE

CROSS-REFERENCES TO RELATED APPLICATIONS

This application claims priority from Japanese Patent Application No. JP2004-269897, filed Sep. 16, 2004, the entire disclosure of which is incorporated herein by reference.

BACKGROUND OF THE INVENTION

The present invention relates to a technology for improving the recording performance of a magnetic disk device, and more particularly, to a technology for achieving stable recording performance, even if the clearance between a head and a recording disk varies with a temperature change.

The magnetic head used for a magnetic disk device is formed (using a thin-film process) at the end of a slider constructed of a sintered body consisting of aluminum (Al), titanium (Ti), and carbon (C), called AlTiC. Hereinafter, a combination of the magnetic head and the slider is referred to collectively as the head/slider. An air-bearing surface (ABS) is formed on the surface of the head/slider that faces the magnetic disk. When the viscous air stream generated on the surface of the magnetic disk which rotates flows along the ABS and the surface of the magnetic disk, the ABS undergoes buoyant force and lifts the head/slider from the surface of the magnetic disk to a position at which the buoyant force maintains a balance with respect to the pressure load of the head gimbal assembly supporting the slider. As a result, while the magnetic disk is rotating, a clearance of a required range is maintained between the magnetic head and a magnetic layer thereof. In order for the magnetic head to perform stable read/write operations on the magnetic layer, the clearance between the magnetic head and the magnetic layer needs to be maintained in the required range.

Too small a clearance between the magnetic head and the magnetic layer could bring the head/slider into contact with the surface of the magnetic disk, resulting in the magnetic disk and the magnetic head being damaged. Conversely, too great a clearance weakens magnetic coupling between the magnetic head and the magnetic layer, thus leading to unstable data read/write operations. In general, the magnetic head is formed up of an inductive recording head which has coils, magnetic pole pieces, and recording gaps, and a giant magnetoresistive (GMR) head which uses GMR elements, or a magnetoresistive (MR) head which uses MR elements.

When a recording current is supplied to the recording head in order to write data onto the magnetic disk, the resistance existing in the coils of the recording head generates heat and increases the peripheral temperatures of the coils. At this time, any differences in thermal expansion coefficient, between the materials constituting the recording head and the materials constituting the slider body, will cause the event, called thermal protrusion, that the sections where the magnetic pole pieces of the recording head form the recording gaps protrude from the ABS. Even if the clearance between the head/slider and the magnetic disk surface is constant, such thermal protrusion will change the clearance between the recording head and the magnetic layer, resulting in trouble with the recording operation.

Patent Document 1 (Japanese Patent Laid-Open No. 2004-110918) discloses a technology for suppressing the deterioration of recording performance, coupled with the contraction of the head elements under a low-temperature environment after the start of recording. According to the invention described in this Patent Document, dummy data is recorded on dummy tracks of a medium for a time interval immediately before desired data is recorded. Patent Document 2 (Japanese Patent Laid-Open No. 2004-79126) discloses a technology for preventing the occurrence of errors by retracting the recessed section of a magnetic head at low temperature and thus increasing a magnetic spacing. According to the invention described in this Patent Reference, before data is recorded, the internal temperature of a magnetic disk device is detected, then its magnetic head is moved to a non-recording region, and at least one sector of dummy data is recorded. Patent Document 3 (Japanese Patent Laid-Open No. 2002-237004) discloses a technology by which the setting of the writing current to be used is changed according to ambient temperature.

BRIEF SUMMARY OF THE INVENTION

In recent years, changes in the clearance between the head/slider and the magnetic layer due to the improvement of the magnetic disk in recording density and an even more significant decrease in the clearance between the magnetic head and the magnetic disk surface, have come to affect recording performance significantly. Hereinafter, the clearance between the recording head and the surface of the magnetic disk which rotates is referred to as flying height. Thermal protrusion due to the Joule heat generated when a recording current is supplied to the coils of the recording head reduces the flying height existing after recording has been continued for the required time and the temperature of the recording head has increased, compared with the flying height existing during a low-temperature time period of the recording head immediately after the start of the recording operation. Changes in the internal temperature of the magnetic disk device also cause thermal protrusion and thus change the flying height.

While the magnetic disk is rotating, contact between the recording head and the magnetic disk needs to be minimized. Therefore, parameters relating to flying height, such as those of the ABS and HGA, are determined on the basis of the flying height existing during an increase in the temperature of the recording head. However, since the flying height existing before thermal protrusion occurs is high, the clearance between the recording head and the magnetic layer may increase so significantly as to prevent the recording head from reaching sufficient field strength when magnetizing the magnetic layer. As a matter of fact, it is already confirmed that when a write command and user data are received from a host computer and recorded on a magnetic disk, about 20 data sectors from the data sector of the first address among all data sectors into which the user data has been written are higher than subsequent data sectors in terms of software error rate (SER).

Magnetic disk devices are required to return a recording complete command to a host computer as soon as possible after receiving a write command therefrom. Speed performance will therefore decrease if, before recording is started, the disk device conducts an operation that reduces flying height, such as recording dummy data, not user data, or warming up by moving the recording head to a retraction region. To solve the problem of unstable recording due to thermal protrusion without reducing the speed performance of the magnetic disk device, it may be possible to set the recording current to a trifle high value so that even when flying height is large, data can be stably written. This method, however, is not a reliable method since the track pitches of the magnetic disks in recent years are becoming even narrower for higher recording density and hence since an increase in the recording current could cause the event of ATE (Adjacent Track Erase) or ATI (Adjacent Track Interference) that the user data on adjacent tracks is updated, and thus reduce SER. There is also another factor to be considered. That is, an increase in the recording current can also cause GMR head noise and/or lead to increased power consumption in the magnetic disk device.

For these reason, a feature of the present invention is to provide a method of controlling a recording current which allows stable recording without causing negative effects even in case of a change in the flying height of a recording head. Another feature of the invention is to provide a method of controlling a recording current which allows stable recording to be realized reliably and easily. Yet another feature of the invention is to provide a magnetic disk device that implements such a control method for a recording current.

The principles of the present invention exist in that in order to make reliable recording of user data possible even when flying height is large under low-temperature conditions of the slider/head, compensation is provided such that the recording current is increased during a time period up to data recording in a required number of data sectors from the data sector of the first address immediately after the start of recording. In a first aspect, the present invention provides a method of controlling the recording current supplied to a recording head of a magnetic disk device in order to record user data in data sectors of a magnetic disk; the control method including a first recording step of, when recording a first section of the user data in a required number of data sectors from a data sector of a starting address for recording the user data to a data sector of an intermediate address, setting the recording current to a first recording current value, and a second recording step of, when recording a second section of the user data in data sectors present between the intermediate address and an ending address, setting the recording current to a second recording current value smaller than the first recording current value.

Data sectors are the sectors for recording user data under host computer commands, and these sectors differ from the sectors used for temporary recording or dummy recording. In the present invention, speed performance does not decrease since changes in flying height are accommodated during user data recording. The required number of data sectors from the starting address are compensatory data sectors, and since user data is recorded in the state where flying height is large, the user data is recorded using a compensatory recording current that is the first recording current value. Counting the time period up to a decrease in flying height, as the number of data sectors pertaining to recording, is indirectly equivalent to measuring the amount of heat supplied to the recording head, and it is possible to appropriately determine the timing of switching from the first recording current value to the second recording current value.

While flying height is large, the possibility that even if the recording current is increased, the user data recorded in the data sectors of adjacent tracks would be overwritten by, for example, the occurrence of so-called ATE is small and the strength of magnetic fields against desired data sectors can be ensured. At the time of start of recording data in data sectors present between the intermediate address and the ending address, since the recording head suffers from thermal protrusion and thus decreases in flying height, the data is recorded with the normal recording current that is the second recording current value.

The second recording current value is a value recorded in most part of data sectors when data is recorded on the magnetic disk. This value is selected so that after flying height has been reduced by the occurrence of thermal protrusion, ATE does not occur and the desired data sectors can be reliably magnetized. If 20 to 30 data sectors from the data sector of the starting address are selected as the number of compensatory data sectors, this number will be appropriate as a period for stabilizing thermal protrusion. Whether the data is to be recorded with the compensatory recording current, and the magnitude of the compensatory recording current used when compensation is to be provided, and the number of compensatory data sectors may be determined according to the particular internal operating temperature of the magnetic disk device. The compensatory recording current can be generated by, for example, increasing only an overshoot current, increasing only a rectangular-wave current, or increasing both the overshoot current and the rectangular-wave current.

The compensatory recording current may also be set to have a plurality of values to suit particular flying height, or may also be adjusted so as to dwindle. When the recording head is switched, a required number of data sectors equivalent to compensatory data sectors from the data sector of the first address of the user data which the next recording head is to record will be used for recording with the compensatory recording current. The methods of controlling a recording current according to the present invention can be easily realized by changing the configuration of a recording current generator provided in the head support mechanism of the magnetic disk device, and modifying firmware.

The present invention has made it possible to provide a method of controlling a recording current which allows stable recording without causing negative effects even in case of a change in the flying height of a recording head. The present invention has also made it possible to provide a method of controlling a recording current which allows stable recording to be realized reliably and easily. In addition, the present invention has made it possible to provide a magnetic disk device that implements such a control method for a recording current.

DETAILED DESCRIPTION OF THE INVENTION

Format of Tracks

Figure 1:
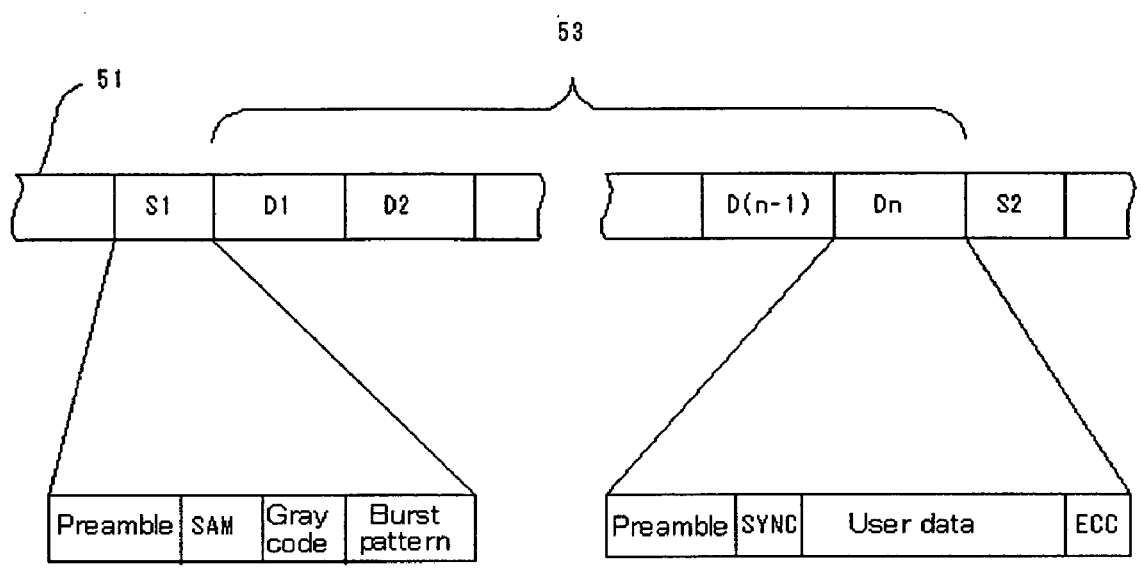
FIG. 1 is a diagram showing a format of a track.

FIG. 1 is a diagram showing a format of a data track 51 provided on a recording surface of a magnetic disk. A magnetic disk device that adopts a data-surface servowriting scheme has servo data embedded in part of the data track 51. The present invention, however, can also be adopted for a servo-surface servowriting scheme. Servo data is recorded at equal angles radially from the innermost peripheral data track of the magnetic disk towards the outermost peripheral data track. FIG. 1 shows servo sectors S1 and S2 that were recorded on part of one data track. A data region 53 including a plurality of data sectors D1to Dn is provided between the servo sectors S1 and S2.

All servo sectors are arranged with a preamble pattern at beginning, followed by a servo address mark (SAM), a gray code, and a burst pattern, in that order. The gray code and the burst pattern are referred to collectively as position information of a head. The preamble is a continuous pattern, which is used to conduct a phase-locked loop (PLL) operation for establishing synchronization between a system clock of the magnetic disk device, the gray code, and the burst pattern. The preamble is also used for gain adjustment of a variable-gain amplifier (VGA) which amplifies the reading outputs of the head position information, sent from a head amplifier.

SAM is a special pattern not used for other purposes, and on detection of SAM, a servo interrupt signal is generated and a hard-disk controller (HDC) enters a servo control state. A servo gate signal used to determine readout timing of the head position information is further generated after SAM detection. A time window is set up for judging whether SAM can be read, and if SAM reading within a required time fails, subsequent processing follows since a servo error is recognized as having occurred.

The gray code is a section that contains information on cylinder numbers of the cylinders constructed as a set of same-numbered tracks of plural recording surfaces (if any). This section also contains servo sector identification numbers. The burst pattern is used for track following to detect an accurate position of the magnetic head with respect to a target track and position the magnetic head at the center of the target track.

A sector scheme for separating the data track 51 into regions of a fixed length is employed for the magnetic disk, and a plurality of data sectors of the same size are arranged in the data region 53. The present invention, however, may employ a variable-length scheme for separating the data track into regions of a variable length. The data sectors are a minimum unit of user data reading/writing with respect to the magnetic disk, and this unit is also used to transfer data between the magnetic disk device and a host computer. The positions of data sectors on a data track where user data will be recorded are determined on the basis of the write gate signals and servo data generated at fixed intervals by the HDC.

A preamble, a SYNC (synchronization) mark, and an error correction code (ECC) are written in each data sector when the magnetic disk device records user data. The preamble is used to conduct a PLL operation when the data is read. The SYNC mark is used to find a starting position of the user data. A size of the user data is selected from data sizes such as 256 bytes, 512 bytes, and 1,024 bytes per data sector. ECC is generated from a bit pattern of the user data by the HDC to detect a reading error. Address information of the data sector may be included in ECC to allow a recording target address error to be detected even if the user data is recorded in a wrong address. A gap region for separating user sectors from one another is provided at boundaries of each user sector so that the user data can be updated for each data sector.

Control of a Recording Current

A method according to the present embodiment for realizing stable recording even in case of changes in flying height due to thermal protrusion is described below with reference to FIGS. 2A to 2D. FIGS. 2A to 2D are diagrams each showing an example of time-varying changes in the recording current supplied to one recording head when user data is recorded.

Figure 2:
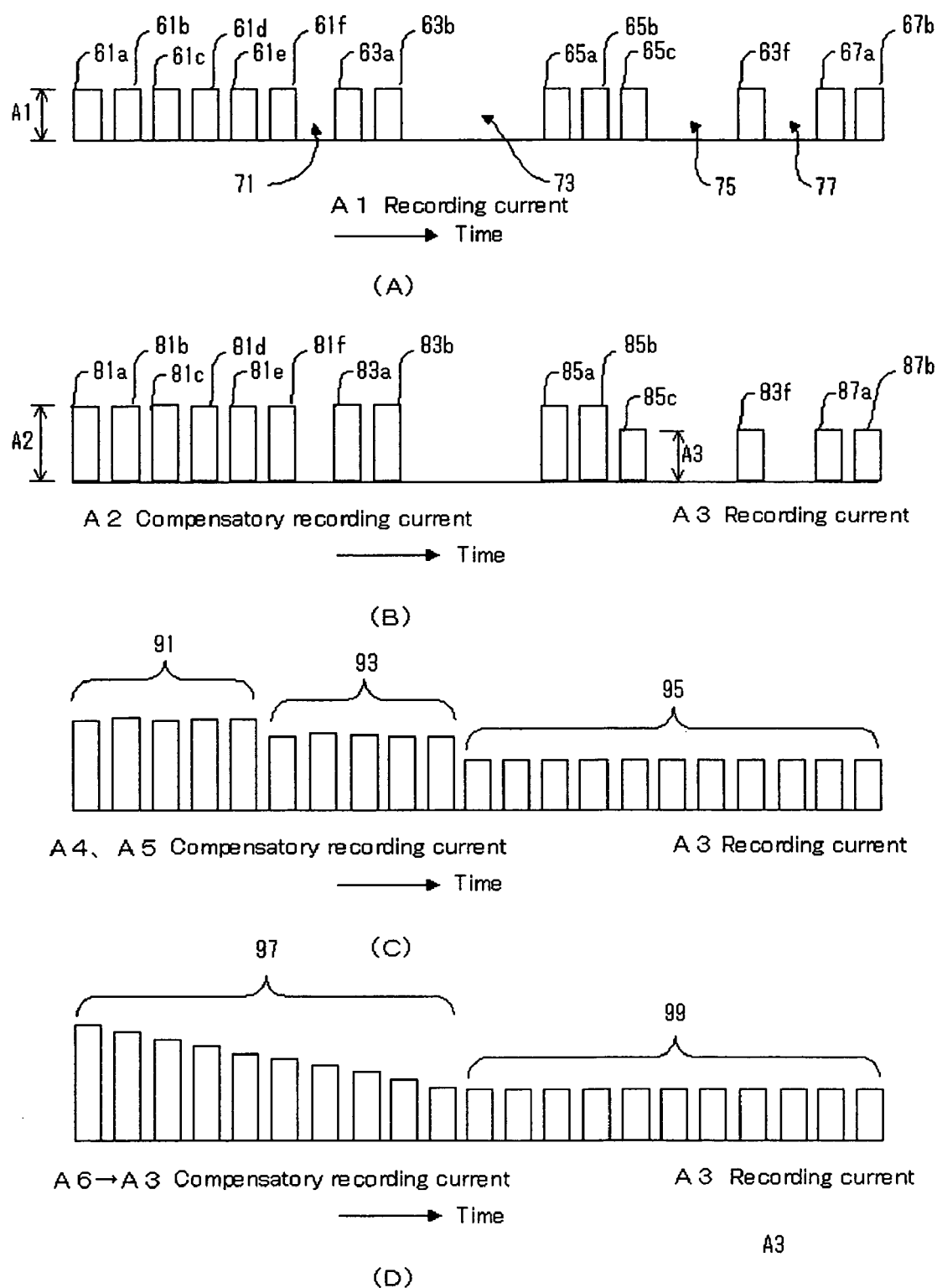
FIGS. 2A to 2D are diagrams each showing an example of time-varying changes in the recording current supplied to a recording head.

FIG. 2A shows changes in the recording current observed before the present invention was applied. Each of the blocks denoted by reference numbers 61a to 67b in FIG. 2A indicates magnitude of the recording current with respect to one data sector. Although the magnitude of the recording current in each data sector is merely denoted as the blocks in FIGS. 2A to 2D, there actually is a flow of a current whose direction of flow reverses according to a particular bit pattern of the user data.

When a write command, user data, and a starting address of a data sector for recording the user data are transferred from a host computer to a magnetic disk device, the magnetic disk device starts recording the user data in a data sector of a specified starting address, with a recording current 61a, and terminates the recording operation by recording in a data sector of an ending address, with a recording current 67b. In the present embodiment, the host computer specifies an address of a data sector by a logic block address (LBA). Instead, however, the address may be specified by a cylinder number (C), a head number (H), or a sector number (S).

Compensations for changes in an internal temperature of the magnetic disk device are conducted for the recording current used when user data is recorded in each data sector. Even in this case, once a recording operation has been started in response to a write command, the recording current is set to have a magnitude of Al for all data sectors 61a to 67b until the recording operation has been completed. The temperature compensations are performed to accommodate changes in flying height by setting a higher recording current for a lower temperature. Each of the six blocks denoted by reference numbers 61a to 67f indicates the recording current recorded in each data sector arranged subsequently to the servo sector S1 of FIG. 1.

Recording in the data sectors included in a data region 53 begins with the recording current 61a and ends with a recording current 61f. Since there is a gap region between data sectors, there is a short time zone in which the flow of the recording current is interrupted between data sectors. Recording currents 63a and 63b indicate the currents recorded in two data sectors subsequent to the servo sector S2 shown in FIG. 1. A time zone 71 in which the flow of the recording current is interrupted between the recording currents 61f and 63a is a time zone in which a GMR head for reading is reading servo data from a servo sector S2. Since defects were detected in the three data sectors subsequent to the data sector in which the recording current 63b was recorded, recording currents 65a to 65c are recorded in three alternative sectors allocated in lieu of the defective sectors.

Alternative sectors are provided at required positions on the magnetic disk, and since these alternative sectors are not arranged subsequently to the data sectors in which the recording current 63b was recorded, the flow of the recording current is interrupted during a seek time or rotational latency time 73 up to completion of movement of the recording head to the alternative sectors. User data as much as there actually were detected defective sectors is recorded in the alternative sectors by use of the recording currents 65a to 65c. After this, the recording head uses a recording current 63f to record user data in nondefective data sectors arranged subsequently to the data sectors in which the recording current 63b was recorded. A seek time or rotational latency time 75 of the recording head occurs at that time. After this, a servo data reading time zone 77 occurs followed by flows of recording currents 67a and 67b for recording in adjacent data sectors. When the user data that was sent from the host computer is recorded through to completion by being recorded in a data sector of an ending address with the recording current 67b, the magnetic disk device will send to the host computer a recording complete command indicating that recording has been completed.

When a plurality of recording heads are present, there also exists a time zone for switching the recording head in order to record data on another recording surface within the same cylinder. In this case, a recording current flows into any one recording head at various intervals, not in order of physical arrangement of data sectors on the track. Once a magnitude A1 of the recording current has been set according to a particular operating ambient temperature of the magnetic disk device, the magnitude A1 will not change from a start of recording in response to a write command, to termination of the recording operation with transmission of a recording complete command.

FIG. 2B shows a pattern of the recording currents that allow stable recording even if thermal protrusion occurs. FIG. 2B shows the case where the same user data as that of FIG. 2A is to be recorded in addresses of the same data sectors. However, FIG. 2B differs in that the recording currents generated at up to the required number of data sectors used for writing from the data sector of the starting address, are subjected to compensation. In FIG. 2B, for the sake of description, 10 data sectors from the data sector of the first address where recording was started with a recording current 81a, to the data sector of the intermediate address where data was recorded with a recording current 85b, are selected and magnitude of the recording currents for these data sectors is set to A2. Magnitude of recording currents 85c to 87b for recording user data from the data sector of the intermediate address to that of the ending address of recording is set to A3 smaller than A2.

Compensation is provided to ensure that the setting A2 of the recording currents is increased above the setting A3. Hereinafter, the recording currents set to A2 are referred to as compensatory recording currents, and 10 data sectors each having a flow of a compensatory recording current are referred to as compensatory data sectors. At data sectors from the starting address having a flow of a compensatory recording current to the intermediate address, flying height is large since the recording head is low in temperature. The recording currents are therefore set to A2 to compensate for decreases in magnetic field strength of the recording head against a magnetic layer of each compensatory data sector. A value allowing the magnetic layer to be reliably magnetized even at large flying height, and causing no ATE on adjacent tracks, is selected as the setting A2. When user data is recorded in compensatory data sectors, the thermal protrusion caused by the recording current flowing into the recording head will stabilize and this, in turn, will reduce flying height. This is why the magnitude of the recording currents is set to A3 until user data has been recorded in the data sector of the ending address of recording.

A value allowing the magnetic layer to be reliably magnetized at low flying height, and causing no ATE on adjacent tracks, is selected as the setting A3. It is desirable that the number of compensatory data sectors should be selected in a range from 20 to 30 in order to obtain stable flying height at a low position. The settings A2 and A3 may be modifiable according to a particular internal temperature of the magnetic disk device. In other words, changes in flying height and the settings of the recording currents can be related more accurately by applying a bias so that the settings A2 and A3 are increased with a decrease in the internal temperature of the magnetic disk device. When the internal temperature of the magnetic disk device is high to a certain degree, the flying height existing before recording is started is not too large. As shown in FIG. 2A, therefore, the recording current may be set without using a compensatory recording current. Description in FIG. 2B focuses on one recording head. However, when the magnetic disk device includes a plurality of recording heads, since the data sector used for recording after the recording head has been switched is handled as the data sector of the starting address, the recording current for the next recording head selected using the same switching procedure is controlled.

When a new write command is next sent from the host computer, a compensatory recording current of the setting A2 is used to record in compensatory data sectors in a similar manner, and a normal recording current of the setting A3 is used to record in subsequent data sectors. According to this recording-current control method, since changes in flying height are accommodated during user data recording, it is possible to suppress increases in SER when recording in data sectors neighboring the starting address at which the write command has been executed, and thus to prevent the magnetic disk device from decreasing in speed performance. Additionally, since large flying height is always maintained while changes in the recording current are being compensated for, the possibility of ATE being increased by overwriting on an adjacent track using a compensatory recording current is very low.

It may be possible, instead of determining the compensation period of the recording current from the number of data sectors used for recording, to conduct the above determination in terms of elapse of time after recording in the data sector of the starting address, as in FIG. 2B. However, since the stability of thermal protrusion has a relationship with the amount of heat supplied to coils of the recording head, even when the determination based on an elapsed time is to be conducted, it is difficult to set the time appropriately. As described above with reference to FIG. 2A, user data is not necessarily recorded in order of physical arrangement of data sectors, so the number of data sectors in which user data is actually recorded during the set time does not become constant. In addition to the data sectors described in FIG. 2A, there would be defective data sectors detected and registered prior to product shipping, and there also are operating conditions specifying that such defective data sectors be skipped during recording. The relationship between the elapsed time and the amount of heat supplied to the recording head according to the particular magnitude of the recording current will be disturbed.

Setting the elapsed time appropriately is difficult because, if a trifle long time is set for preventing SER from deteriorating at or near the data sectors existing immediately after the start of recording, ATE may deteriorate, and because, if a trifle short time is set for preventing ATE from deteriorating, SER may deteriorate at or near such data sectors. However, using the method of the present embodiment, shown in FIG. 2B, allows an appropriate time to be easily set in terms of the number of data sectors in which is recorded the timing that deteriorates neither SER nor ATE.

FIGS. 2C and 2D are diagrams explaining other methods of controlling a recording current. In FIG. 2C, when user data recording is started from a data sector of a starting address, part of compensatory data sectors are recorded with a compensatory recording current 91 set to A4 as its magnitude, and remaining part of the compensatory data sectors are recorded with a compensatory recording current 93 whose magnitude is set to A5, not greater than A4. The data sectors that follow are recorded with a compensatory recording current 95 whose magnitude is set to A3, not greater than A5. In FIG. 2D, when user data recording is started from a data sector of a starting address, compensatory data sectors are recorded with a compensatory recording current 97 whose magnitude progressively decreases, for each data sector, from a recording current of the setting A6, down to a recording current of the setting A3 smaller than the setting A6. The data sectors that follow are recorded with a compensatory recording current 99 whose magnitude is set to A3. Since changes in flying height due to thermal protrusion are estimated to dwindle following a start of supplying the recording current to the recording head, the control methods in FIGS. 2C and 2D relate changes in flying height and compensation levels of the recording current more accurately.

Overshoot Current

Figure 3:
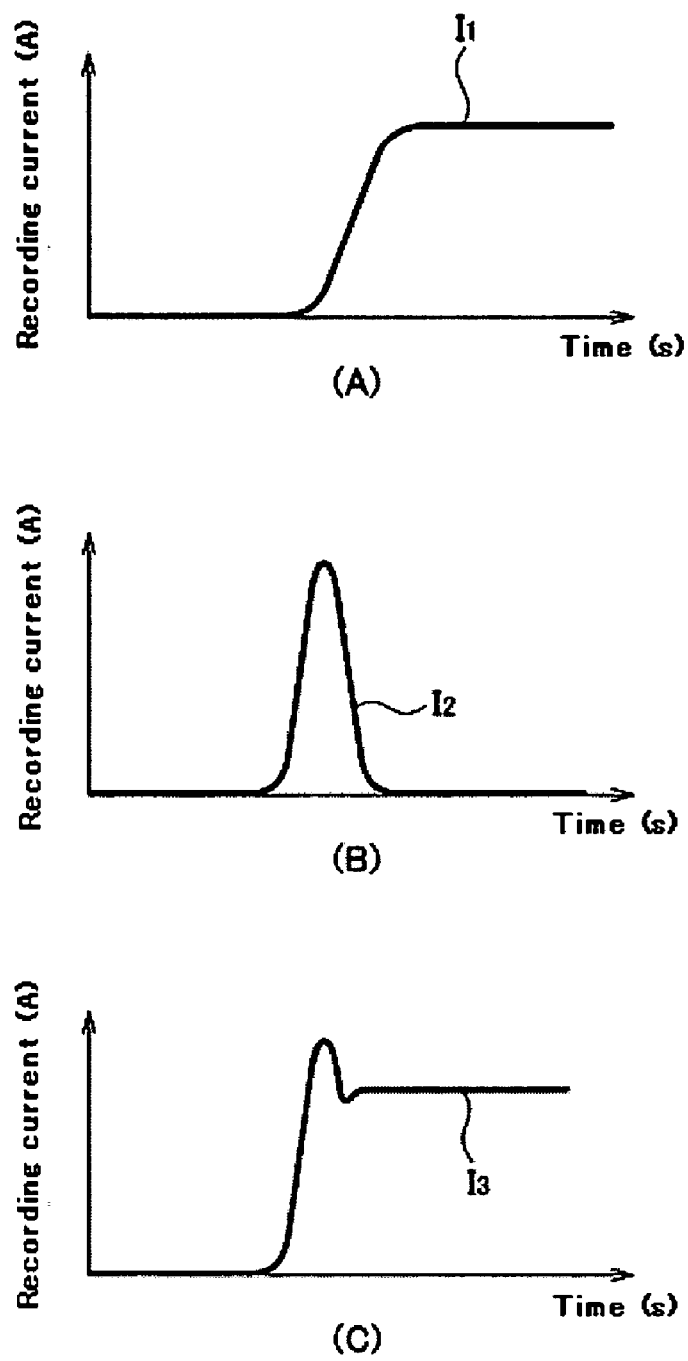
FIGS. 3A to 3C are diagrams each explaining an overshoot current superimposed on a recording current.

FIGS. 3A to 3C are diagrams each explaining an overshoot current superimposed on a recording current. It is desirable that the recording current supplied to the recording head should be a pulse current of an accurate rectangular waveform. As the recording current is increased in frequency, however, the waveform will be deformed more significantly and/or a rise time of pulses will be extended by impedance of the recording head, with the result that recording at a higher rate will be affected. Japanese Patent Laid-Open No. 2004-30730 discloses, as a method of compensating for these disadvantages, a technology for superimposing an overshoot current on a rectangular-wave current. In FIG. 3A, although a rectangular-wave current I1 generated by a rectangular-wave generator is shown, a rising portion of the current is not vertical. Even if the rectangular-wave current I1 is supplied to the recording head, a slight deal of time will be spent until a magnetic field has been strengthened to such a degree that the magnetic disk is magnetized.

FIG. 3B shows a waveform of an overshoot current I2 generated by an overshoot current generator. The overshoot current I2 is an impulse-like current, a peak of which is generated at a position slightly delayed behind a rising position of the rectangular-wave current I1 in terms of phase. FIG. 3C shows a waveform of a resultant current I3 obtained by combining the rectangular-wave current I1 and the overshoot current I2. The resultant current I3 rises faster than the rectangular-wave current I1 and has a peak protruding from a flat portion. Consequently, the resultant current I3 can compensate for the delay in the rise time of the rectangular-wave current I2, thus allowing faster magnetic recording.

The overshoot current I2 is superimposed on the rectangular-wave current each time the current flowing into the recording head reverses in direction. A compensatory recording current can therefore be generated by changing the overshoot current in magnitude. The compensatory recording current can likewise be generated by changing only the rectangular-wave current in magnitude or changing both the rectangular-wave current and the overshoot current in magnitude.

Schematic Configuration of the Magnetic Disk Device

Figure 4:
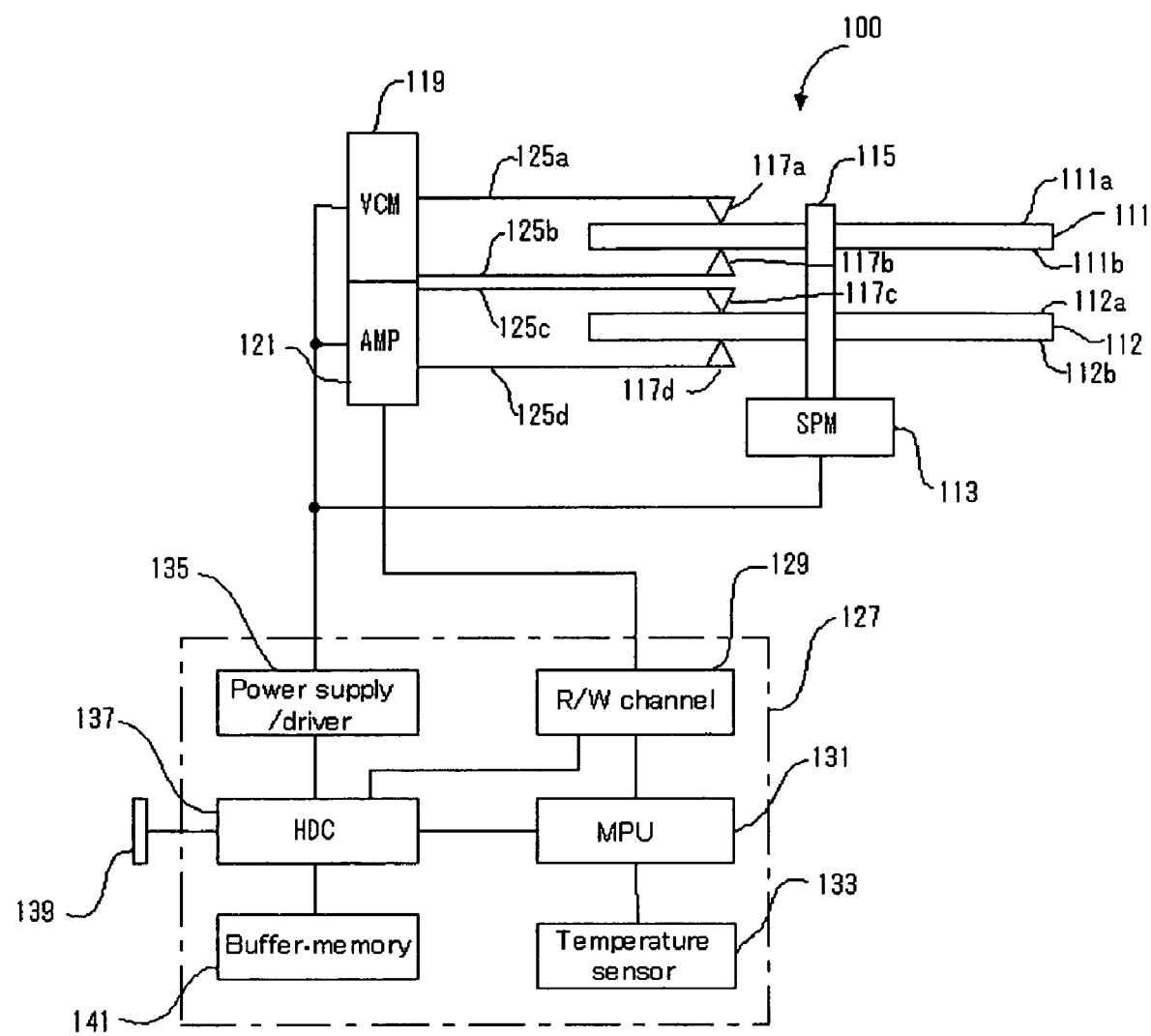
FIG. 4 is a block diagram showing a schematic configuration of the magnetic disk device used in an embodiment of the present invention.

FIG. 4 is a schematic block diagram of a magnetic disk device 100 which realizes the recording-current control methods heretofore described. The magnetic disk device 100 includes two magnetic disks denoted as 111 and 112. The magnetic disk 111 has recording surfaces 111a and 111b, and the magnetic disk 112 has recording surfaces 112a and 112b. Each of the four recording surfaces has a magnetic layer formed for magnetic recording, and the magnetic layer has a protective layer on its surface. The magnetic disks 111 and 112 are fixed to a spindle 115 at required intervals, and both disks rotate as an integrated unit by means of a spindle motor (SPM) 113.

The magnetic disk device 100 also has four magnetic heads 117a, 117b, 117c, and 117d that are associated with the recording surfaces 111a, 111b, 111c, and 111d, respectively. Each magnetic head is formed at a slider, as a dual head functioning as an inductive head for recording and a GMR head for reproduction. In the present invention, however, an inductive magnetic head usable for both recording and reproduction can be adopted instead. The four magnetic heads are switched such that either one becomes active during disk device operation to access a data sector of the address specified from the host computer.

The sliders where the magnetic heads 117a, 117b, 117c, and 117d are formed are installed on head support mechanisms 125a, 125b, 125c, and 125d respectively. Each of the head support mechanisms includes a flexural member, a suspension, a carriage, and a voice coil motor (VCM) 119, and positions an associated head on a required track of the associated magnetic disk. A combination of the head support mechanism and the head/slider is referred to as a head stack assembly (HSA).

The head support mechanism has a head amplifier 121. The head amplifier 121 includes a read/write driver (hereinafter, referred to as the R/W driver), a driver register, a read/write selector circuit (hereinafter, referred to as the R/W selector circuit), and other elements. A further detailed configuration of the amplifier is described later.

The magnetic disk device 100 further has a circuit board 127 on which are mounted a read/write channel (hereinafter, referred to as the R/W channel) 129, an MPU 131, a power supply/driver 135, an HDC 137, and a buffer memory 141. The R/W channel 129 includes elements such as: a modulation circuit that converts data bit strings into bit strings suitable for recording on the magnetic disk; a parallel/serial converter that performs conversions between parallel data and serial data; and a variable-gain amplifier (VGA) that adjusts reading signals to a fixed voltage level.

The MPU 131 is constructed of elements such as an MPU for conducting total operation control of the magnetic disk device 100, a ROM for storing various programs and firmware relating to control of the recording currents according to embodiments of the present invention, an EEPROM for storing various parameters, and a RAM used to execute the programs and as work regions. The MPU 131 also has a connected temperature sensor 133 that measures an internal temperature of the MPU. A temperature correction table for relating an internal operating temperature of the magnetic disk device and a recording current and thus generating an appropriate recording current according to a particular level of thermal protrusion is stored in the EEPROM.

The temperature correction table is used to set an appropriate recording current value according to the particular internal temperature of the magnetic disk device. More particularly, this table relates the recording current to the internal temperature of the magnetic disk device so that the recording current is increased with decreases in the internal temperature. The temperature correction table includes data settings of the rectangular-wave current and overshoot current with respect to the internal temperature of the magnetic disk device. The table also includes compensation data for generating the compensatory recording currents used to compensate for changes in the recording current of the present embodiment. In addition, the table includes the number of compensatory data sectors. The compensation data is related to the internal temperature, and includes compensation values with respect to the rectangular-wave current and those of the overshoot current. The number of compensatory data sectors is adjusted to a greater value for a lower internal temperature.

The HDC 137 includes elements such as: a servo controller for providing control of seek operation and track-following operation, based on servo data; a buffer controller for controlling the buffer memory 141; and an ECC circuit for generating correction bits for the data bits sent from the host computer, and for correcting the user data read from the magnetic disk. The buffer memory 141 is used to implement high-speed data transfer between the host computer and the magnetic disk device.

The power supply/driver 135 includes elements such as: an SPM driver for supplying an operating current to the SPM 113; a VCM driver for supplying an operating current to the VCM 119; a D/A converter; and a power supply circuit. The circuit board 127 has a connected interface connector 139 to conduct data communications with the host computer.

Configuration of the Head Amplifier

Figure 5:
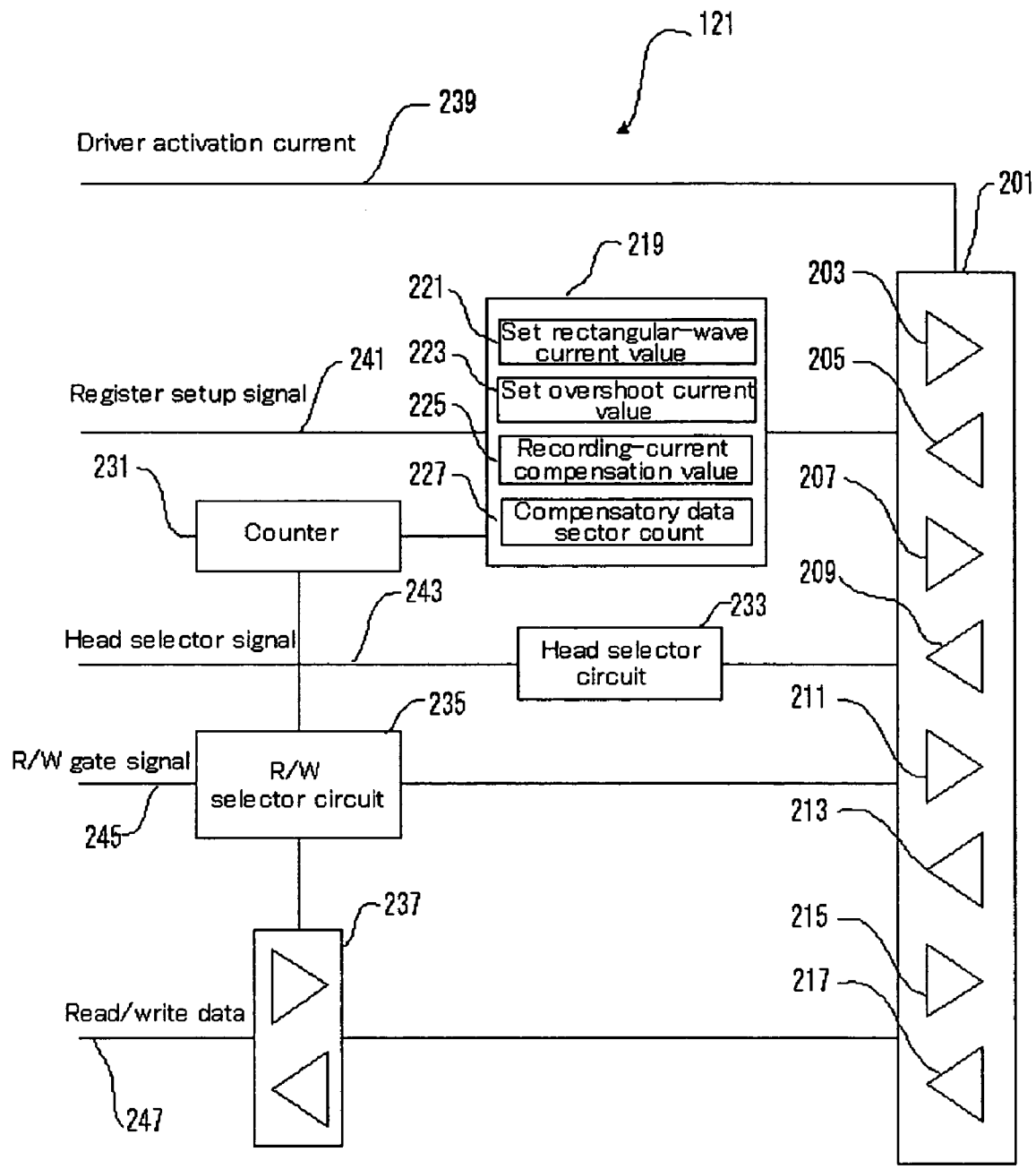
FIG. 5 is a schematic block diagram of a head amplifier.

FIG. 5 is a schematic block diagram of the head amplifier 121 that generates a recording current. A read/write driver (R/W driver) 201 receives a driver activation current from the power supply/driver 135 through a line 239. The R/W driver 201 has write drivers 203, 207, 211, and 215, which supply the recording current to recording heads of the magnetic heads 117a, 117b, 117c, and 117d, respectively. The R/W driver 201 is also equipped with read amplifiers 205, 209, 213, and 217, which supply a bias current to GMR reading heads of the magnetic heads 117a, 117b, 117c, and 117d, respectively, and acquire changes in electrical resistance due to the magnetic field recorded on the magnetic disk, as changes in voltage.

Additionally, the R/W driver 201 has a circuit for generating a rectangular-wave current, a circuit for generating an overshoot current, and a circuit for combining both currents. The R/W driver 201 is adapted to receive a digital signal from a driver register 219 and modify rectangular-wave current components and overshoot current components of the recording current independently in terms of magnitude. The driver register 219 includes a register 221 for storing digital data settings concerning the rectangular-wave currents used to generate recording currents whose magnitude is the setting A3 shown in FIG. 3B, and a register 223 for storing digital data settings concerning overshoot current values. The driver register 219 further includes a register 225 for storing digital compensation data equivalent to any differences in current value between the recording currents with the magnitude of the setting A3 and the compensatory recording currents with the magnitude of the setting A2, and a register 227 for storing the number of compensatory data sectors. The digital compensation data is constructed so that a compensation value for a rectangular-wave current and that of an overshoot current can be set independently.

Storage of control data for each register constituting the driver register 219 is accomplished by the MPU 131 making reference to internal data measurements of a temperature correction table and a temperature sensor 133 through a line 241. Moreover, the driver register 219 has a logic circuit, and conducts operation control of the R/W driver 201, based on the data stored in each register. A counter 231 counts the number of write gate signals sent from a read/write selector circuit (R/W selector circuit) 235. The number of write gate signals is equivalent to the number of data sectors involved with writing. The R/W selector circuit 235 receives a R/W gate signal concerning an operation mode of either read or write operation, from the HDC 137 through a line 245, and selects an operation mode for both the R/W driver 201 and a R/W buffer 237.

When transferring read or write user data to/from the R/W channel 129 through a line 247, the R/W buffer 237 temporarily records the user data. A head selector circuit 233 receives a head selector signal from the HDC 137 through a line 243 and makes any one of the four magnetic heads (117a, 117b, 117c, 117d) active.

Operational Description of the Head Amplifier

Figure 6:
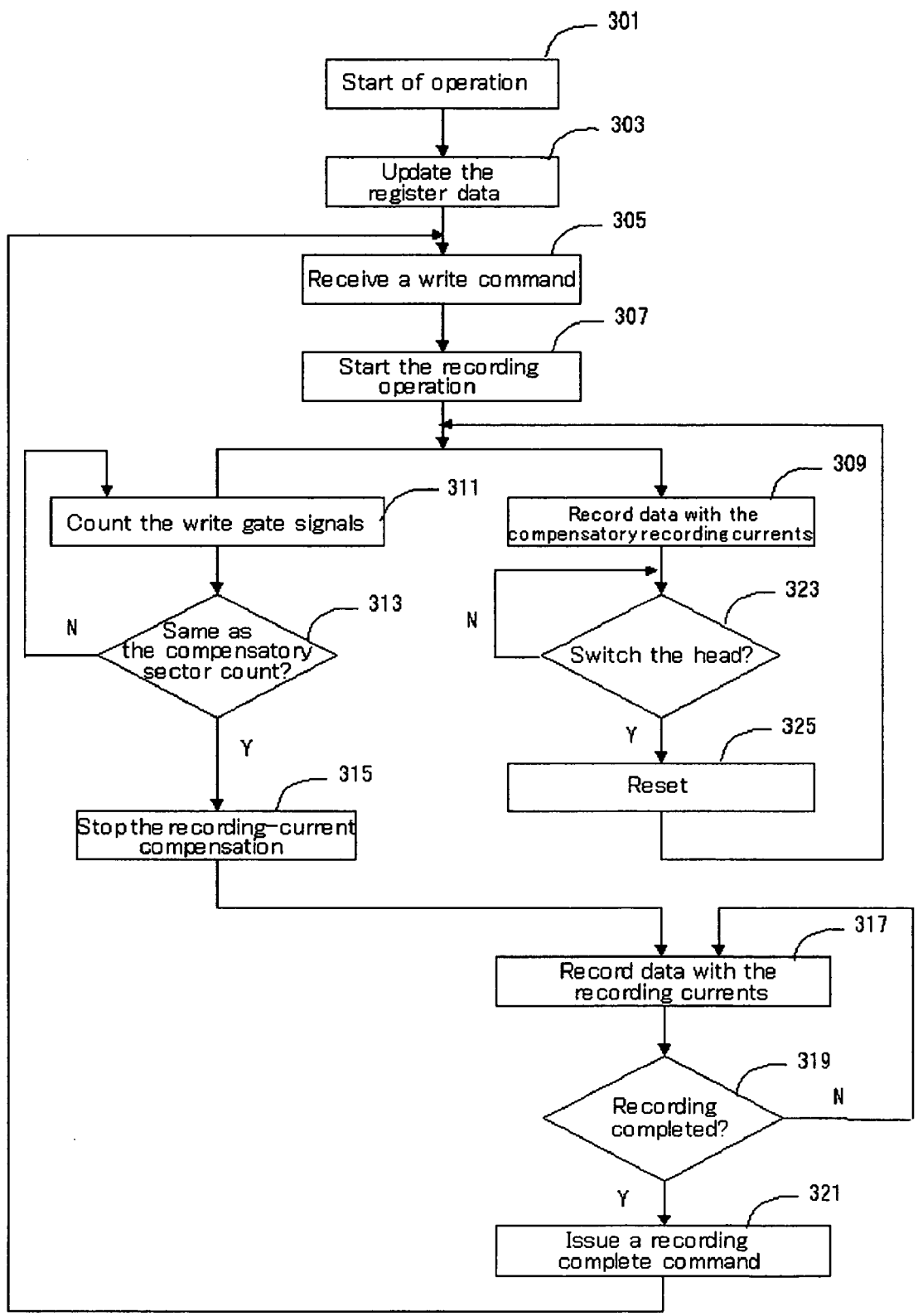
FIG. 6 is a flowchart explaining a recording-current control method of the above embodiment.

Next, the operation of the head amplifier 121 during user data recording is described below referring to FIGS. 4 to 6. FIG. 6 is a flowchart explaining a recording-current control method of the present embodiment. The magnetic disk device 100 is connected to the host computer via the interface connector 139. In block 301, power is supplied to the magnetic disk device 100. In block 303, the stored firmware within the ROM of the MPU 131 uses a temperature signal of the temperature sensor 133 and the temperature correction table, and if necessary, causes the HDC 137 to update contents of the driver register 219. Before recording is started, the registers 221, 223, 225, and 227 of the driver register 219 are each set to an enabled state, and during recording, the driver register 219 controls the R/W driver 201 so that this driver supplies compensatory recording currents as many as there actually are compensatory data sectors, to the recording head.

In block 305, a write command, user data, an LBA (logic block address) indicating the first address of the data sector where the recording of the user data is to be started, and the number of LBAs required for the recording of the user data are sent from the host computer to the magnetic disk device 100. The MPU 131 interprets the write command that has been sent from the HDC 137, and conducts control so that the R/W channel 129 and the HDC 137 operate in a recording mode. After ECC has been added to the user data by the HDC 137, the user data is sent to the R/W channel 129.

In bock 307, the HDC 137 sends a write gate signal to the R/W selector circuit 235 of the head amplifier 121 at fixed periods. The R/W selector circuit 235 sets the R/W driver 201 and the R/W buffer 237 to the recording mode and further sends the write gate signal to the counter 231. The HDC 137 sends a head selector signal to the head selector circuit 233 in response to a command from the MPU 131 and selects a recording surface on which are present the LBA-specified data sectors for recording the user data.

The R/W driver 201 operates in accordance with data settings of the registers 221, 223, and 225 of the driver register 219, and in block 309, the R/W driver 201 starts recording from the data sector of the starting address, with the compensatory recording currents of the setting A2. The R/W driver 201 is controlled in response to the signals received from the head selector circuit 233 and the R/W selector circuit 235. The user data that has been transferred from the R/W channel 129 to the R/W buffer 237 is recorded in required data sectors of the magnetic disk. In block 311, the counter 231 counts the write gate signals whose transmission from the R/W selector circuit 235 was initiated with the start of recording in the data sector of the starting address, and sends an output of the counter to the driver register 219.

In block 313, the driver register 219 that has received the count of the write gate signals compares this value with a setting previously stored in the register 227. If both values match, the driver register 219 sets both the register 225 that has retained the digital compensation data sent to the R/W driver 201, and the register 227 that has retained the number of compensatory data sectors has been stored, to a disabled state in block 315. The setting operation is performed by the logic circuit built within the driver register 219.

In block 317, the R/W driver 201 subsequently records the user data in accordance with the digital data settings of the registers 221 and 223 of the driver register 219 by using the recording currents of the setting A3. During recording, the R/W driver 201 switches the compensatory recording currents to the recording currents in accordance with the output of the counter 231 while the recording operation is in progress. The compensatory recording currents to the recording currents can likewise be switched by sending a command to the R/W driver during recording. In this method, however, the high-frequency noise originated from the head amplifier performing the recording operation may affect an associated command line, thus resulting in the R/W driver malfunctioning. However, according to the switching scheme of the present embodiment, the switching operation stabilizes since the R/W driver 201 can be controlled just by operating the driver register 219 without sending a command. In block 319, the registers 225 and 227 remain in a disabled state until the recording of the user data sent from the host computer has been completed, and the user data is recorded with the recording currents of the setting A3. On completion of user data recording in block 319, the magnetic disk device 100 sends a recording complete command to the host computer in block 321, and all registers of the driver register 219 are set to an enabled state.

When a new write command is next sent from the host computer, processing returns to block 305, from which user data recording with compensatory recording currents and recording currents is then repeated using the same procedure. After the start of user data recording in block 309 with the compensatory recording current setting of A2 or during continuation of user data recording in block 317 with the recording current setting of A3, when the recording head is switched in block 323 according to the head selector signal sent from the HDC 137, all registers of the driver register 219 are set to an enabled state and the counter 231 is reset in block 325. After this, processing returns to blocks 311 and 309. Therefore, even if the recording head is switched during a time period from the start of user data recording in response to one write command to an end of the recording, a period of large flying-height data can also be recorded with a compensatory recording current during use of the next recording head selected by the switching operation.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims alone with their full scope of equivalents.

What is claimed is:

1. A method for controlling a recording current supplied to a recording head in a magnetic disk device in order to record user data in data sectors of a magnetic disk, said method comprising:

a first recording of, when recording a first section of the user data in a required number of data sectors from a data sector of a starting address of the recording of the user data to a data sector of an intermediate address, setting the recording current to a first recording current value;

a second recording of, when recording a second section of the user data in the data sectors arranged from the data sector of the intermediate address towards an ending address, setting the recording current to a second recording current value smaller than the first recording current value, wherein the first recording current value and the second recording current value are both generated by combining a rectangular-wave current and an overshoot current, and a rectangular-wave current value forming the first recording current is greater than a rectangular-wave current value forming the second recording current;

measuring an internal temperature of the magnetic disk device; and changing at least one of the first recording current value, the second recording current value, and the required number of data sectors according to a value of the temperature measured, wherein the number of data sectors ranging from the starting address to the intermediate address is changed according to the temperature measured.

2. A method for controlling a recording current supplied to a recording head in a magnetic disk device in order to record user data in data sectors of a magnetic disk, said method comprising:

a first recording of, when recording a first section of the user data in a required number of data sectors from a data sector of a starting address of the recording of the user data to a data sector of an intermediate address, setting the recording current to a first recording current value;

a second recording of, when recording a second section of the user data in the data sectors arranged from the data sector of the intermediate address towards an ending address, setting the recording current to a second recording current value smaller than the first recording current value, wherein the first recording current value and the second recording current value are both generated by combining a rectangular-wave current and an overshoot current, and an overshoot current value forming the first recording current is greater than an overshoot current value forming the second recording current;

measuring an internal temperature of the magnetic disk device; and changing at least one of the first recording current value, the second recording current value, and the required number of data sectors according to a value of the temperature measured, wherein the number of data sectors ranging from the starting address to the intermediate address is changed according to the temperature measured.

3. A method for controlling a recording current supplied to a recording head in a magnetic disk device in order to record user data in data sectors of a magnetic disk, said method comprising:

a first recording of, when recording a first section of the user data in a required number of data sectors from a data sector of a starting address of the recording of the user data to a data sector of an intermediate address, setting the recording current to a first recording current value;

a second recording of, when recording a second section of the user data in the data sectors arranged from the data sector of the intermediate address towards an ending address, setting the recording current to a second recording current value smaller than the first recording current value, wherein the first recording current value and the second recording current value are both generated by combining a rectangular-wave current and an overshoot current, a rectangular-wave current value forming the first recording current is greater than a rectangular-wave current value forming the second recording current; and an overshoot current value forming the first recording current is greater than an overshoot current value forming the second recording current;

measuring an internal temperature of the magnetic disk device; and changing at least one of the first recording current value, the second recording current value, and the required number of data sectors according to a value of the temperature measured, wherein the number of data sectors ranging from the starting address to the intermediate address is changed according to the temperature measured.

4. A method for controlling a recording current supplied to a first and a second recording head in a magnetic disk device in order to record user data in data sectors of a magnetic disk, wherein the magnetic disk device is connected to a host computer, said method comprising:
   receiving, from the host computer, a write command, the user data, and a starting address of a data sector for recording the user data;
   a first recording of, when recording a first section of the user data in a required number of data sectors from the data sector of the starting address to a data sector of a first intermediate address, setting the recording current to a first recording current value;
   a second recording of, when recording a second section of the user data in the data sectors arranged from the data sector of the first intermediate address towards an ending address, setting the recording current to a second recording current value smaller than the first recording current value; and
   a third recording of after a recording head for recording the user data has been switched from the first recording head to the second recording head, setting the recording current to the first recording current value when the second recording head records a third section of the user data in a required number of data sectors from the data sector of the starting address of the recording of the user data to a data sector of a second intermediate address.

5. The control method according to claim 4, wherein said first recording includes changing the recording current such that this current dwindles from the first recording current value to the second recording current value.

6. The control method according to claim 4, further comprising:
   measuring an internal temperature of the magnetic disk device; and
   changing the number of data sectors ranging from the starting address to the first intermediate address, according to the temperature measured.

7. A magnetic disk device for recording user data, said device comprising:
   a magnetic disk with a plurality of data sectors;
   a recording head supported by a head support mechanism, said recording head recording the user data on said magnetic disk;
   a recording-current generator that supplies a recording current of a first recording current value to said recording head when said recording head records a first section of the user data in a required number of data sectors from a data sector of a starting address for recording the user data to a data sector of an intermediate address, said generator supplying a recording current of a second recording current value smaller than the first recording current value to said recording head when said recording head records a second section of the user data in data sectors from the data sector of the intermediate address towards an ending address; and
   a controller configured to control said recording-current generator,
   wherein said recording-current generator includes:
      a driver register set up by said controller; and
      a read/write driver set up by said driver register, said read/write driver supplying a recording current of the first recording current value as the current generated by combining a rectangular-wave current and an overshoot current, and
   wherein said driver register includes a first register to store a data setting of the rectangular-wave current, a second register to store a data setting of the overshoot current, and a third register to store compensation data for the overshoot current.

8. The magnetic disk device according to claim 7, wherein said driver register includes a fourth register to store the number of data sectors ranging from the starting address to the intermediate address.

9. The magnetic disk device according to claim 8, further comprising a temperature sensor that measures an internal temperature of said magnetic disk device, wherein, in accordance with a value of said temperature sensor, said controller modifies the data settings of the registers constituting said driver register.

10. The magnetic disk device according to claim 7, further comprising a temperature sensor that measures an internal temperature of said magnetic disk device, wherein, in accordance with a value of said temperature sensor, said controller modifies the data settings of the registers constituting said driver register.

11. A magnetic disk device for recording user data, said device comprising:
   a magnetic disk with a plurality of data sectors;
   a recording head supported by a head support mechanism, said recording head recording the user data on said magnetic disk;
   a recording-current generator that supplies a recording current of a first recording current value to said recording head when said recording head records a first section of the user data in a required number of data sectors from a data sector of a starting address for recording the user data to a data sector of an intermediate address, said generator supplying a recording current of a second recording current value to said recording head when said recording head records a second section of the user data in data sectors from the data sector of the intermediate address towards an ending address, wherein the first recording current value and the second recording current value are both generated by combining a rectangular-wave current and an overshoot current, a rectangular-wave current value forming the first recording current is greater than a rectangular-wave current value forming the second recording current; and an overshoot current value forming the first recording current is greater than an overshoot current value forming the second recording current;
   a controller configured to control said recording-current generator, wherein said recording-current generator includes a counter that starts counting the number of data sectors in which the user data is to be recorded, from the data sector of the starting address according to the number of write gate signals received from said controller; and
   at least one additional recording head, wherein said counter is reset when the recording head for recording the user data is switched.

12. The magnetic disk device according to claim 11, wherein said recording-current generator is installed in said head support mechanism.

13. A method for controlling a recording current supplied to a recording head in a magnetic disk device in order to record user data in data sectors of a magnetic disk, said method comprising:

- a first recording of, when recording a first section of the user data in a required number of data sectors from a data sector of a starting address of the recording of the user data to a data sector of an intermediate address, setting the recording current to a first recording current value;
- a second recording of, when recording a second section of the user data in the data sectors arranged from the data sector of the intermediate address towards an ending address, setting the recording current to a second recording current value smaller than the first recording current value, wherein the first recording current value and the second recording current value are both generated by combining a rectangular-wave current and an overshoot current;
- measuring an internal temperature of the magnetic disk device; and
- changing at least one of the first recording current value, the second recording current value, and the required number of data sectors according to a value of the temperature measured, wherein the number of data sectors ranging from the starting address to the intermediate address is changed according to the temperature measured.

14. The control method according to claim 13, further comprising measuring an internal temperature of the magnetic disk device, wherein said first recording includes setting the recording current to the first recording current value when the temperature measured is less than a required value.

15. The control method according to claim 13,
   wherein the first recording current value is changed according to a value of the temperature measured.

16. The control method according to claim 13,
   wherein the second recording current value is changed according to a value of the temperature measured.

17. The control method according to claim 13, wherein said first recording includes setting the recording current to a third recording current value smaller than the first recording current value, but greater than the second recording current value.

* * * * *